US010715318B2

(12) United States Patent
Charters et al.

(10) Patent No.: US 10,715,318 B2
(45) Date of Patent: Jul. 14, 2020

(54) LIGHTWEIGHT CRYPTOGRAPHIC SERVICE FOR SIMPLIFIED KEY LIFE-CYCLE MANAGEMENT

(71) Applicant: International Business Machines Corporation, Armonk, NY (US)

(72) Inventors: Graham C. Charters, Hampshire (GB); Bret W. Dixon, South Perth (AU); Benjamin T. Horwood, North Perth (AU); Alexander H. Poga, Wembley (AU); Mark A. Shewell, Perth (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 241 days.

(21) Appl. No.: 15/877,789

(22) Filed: Jan. 23, 2018

(65) Prior Publication Data
US 2019/0229896 A1  Jul. 25, 2019

(51) Int. Cl.
*H04L 9/08* (2006.01)
*H04L 9/32* (2006.01)
*G06F 21/31* (2013.01)
*H04L 29/06* (2006.01)
*G06F 21/60* (2013.01)

(52) U.S. Cl.
CPC .............. *H04L 9/083* (2013.01); *G06F 21/31* (2013.01); *H04L 9/0825* (2013.01); *H04L 9/0894* (2013.01); *H04L 9/3247* (2013.01); *G06F 21/602* (2013.01); *H04L 63/0442* (2013.01)

(58) Field of Classification Search
CPC ..... H04L 9/083; H04L 9/3247; H04L 9/0894; H04L 9/0825; H04L 63/0442; G06F 21/31; G06F 21/602
USPC ........................................................ 380/282
See application file for complete search history.

(56) References Cited

U.S. PATENT DOCUMENTS 8,724,815 B1  5/2014 Roth et al.
2008/0319909 A1  12/2008 Perkins et al.
(Continued)

OTHER PUBLICATIONS

Li, "An online biometrics-based secret sharing scheme for multi-party cryptosystem using smart cards." network 3.4 (2010): 5.
(Continued)

*Primary Examiner* — Kambiz Zand
*Assistant Examiner* — Aubrey H Wyszynski
(74) *Attorney, Agent, or Firm* — Cantor Colburn LLP; William Kinnaman

(57) ABSTRACT

A method for a cryptographic service facilitating asymmetric encryption is provided. The cryptographic service is implemented on one or more computer systems. The method includes receiving, by the cryptographic service, one or more unique identifiers. The method also includes determining, by the cryptographic service, whether each of the one or more unique identifiers is valid. The method includes generating, by the cryptographic service, a key pair per unique identifier of the one or more unique identifiers based on whether the corresponding unique identifier is valid. The method includes sending, by the cryptographic service, a success reply including a public key for each key pair generation.

12 Claims, 6 Drawing Sheets

(56) References Cited

U.S. PATENT DOCUMENTS

| | | | |
|---|---|---|---|
| 2009/0010434 A1* | 1/2009 | Carles | H04N 21/64322 |
| | | | 380/255 |
| 2010/0266132 A1 | 10/2010 | Bablani et al. | |
| 2014/0019753 A1 | 1/2014 | Lowry et al. | |
| 2014/0050317 A1 | 2/2014 | Sabin | |
| 2018/0324158 A1* | 11/2018 | Brickell | H04L 63/061 |

OTHER PUBLICATIONS

Wang et al., "A secure communication scheme for multiagent systems." Pacific Rim International Workshop on Multi-Agents. Springer Berlin Heidelberg, 1998.

Bijani et al., "A review of attacks and security approaches in open multi-agent systems." Artificial Intelligence Review 42.4 (2014): 607-636.

Zhang et al. "An adaptive security protocol for a wireless sensor-based monitoring network in smart grid transmission lines." Security and Communication Networks 9.1 (2016): 60-71.

* cited by examiner

LIGHTWEIGHT CRYPTOGRAPHIC SERVICE FOR SIMPLIFIED KEY LIFE-CYCLE MANAGEMENT

BACKGROUND

The disclosure relates generally to cryptography, and more specifically, to implementing a lightweight cryptographic service for a simplified key life-cycle management.

In general, asymmetric encryption is a technology that involves public and private key pairs for the purpose of identity, data integrity and data protection. One common use of asymmetric encryption is by secure sockets layer/transport layer security (SSL/TLS), which is used to encrypt a "secret key" used to generate a symmetric key that is ultimately used to encrypt data transmitted between nodes on a network. Another popular use of asymmetric encryption is digital signing, where data is hashed and the hash is subsequently encrypted with a private key, guaranteeing the data was "signed" by a particular identity (i.e., the owner of the private key), and guarantees the data has not changed (integrity) after it was signed. Typically, key pairs are stored in key stores or key databases, which associate the private key with a digital certificate, which contains the paired public key. The digital certificate can be distributed across a network, allowing applications to, for example, verify digital signatures and encrypt/decrypt data. Key pairs require key life-cycle management in that they ultimately expire and need to be renewed, and sometimes become compromised and end up on a revocation list requiring that they are no longer used. Key life-cycle management also requires that public keys (in digital certificates) are distributed and registered in appropriate key databases around a network so that they can be used by applications when needed. An enterprise may have hundreds or even thousands of key pairs to manage which can be a complex and time consuming task. A failure in key life-cycle management can result in application or system failure.

Digital certificates are also costly. For example, a server certificate issued by a trusted certificate authority (CA) may cost a yearly fee times the number of certificates used by an enterprise. For this reason, certificates are typically used by servers only, and not clients that can count in the thousands. In some cases an enterprise may issue their own certificates, but this introduces the problem of propagating the private CA or root certificate to key stores that will need to trust certificates issued by the enterprise, both internally and externally.

SUMMARY

According to one or more embodiments, a method for a cryptographic service facilitating asymmetric encryption is provided. The cryptographic service is implemented on one or more computer systems. The method includes receiving, by the cryptographic service, one or more unique identifiers. The method also includes determining, by the cryptographic service, whether each of the one or more unique identifiers is valid. The method includes generating, by the cryptographic service, a key pair per unique identifier of the one or more unique identifiers based on whether the corresponding unique identifier is valid. The method includes sending, by the cryptographic service, a success reply including a private key for each key pair generation.

According to one or more embodiments, the above method for a cryptographic service facilitating asymmetric encryption can be implemented as a system, a hardware architecture, a computer program product, and/or a device.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
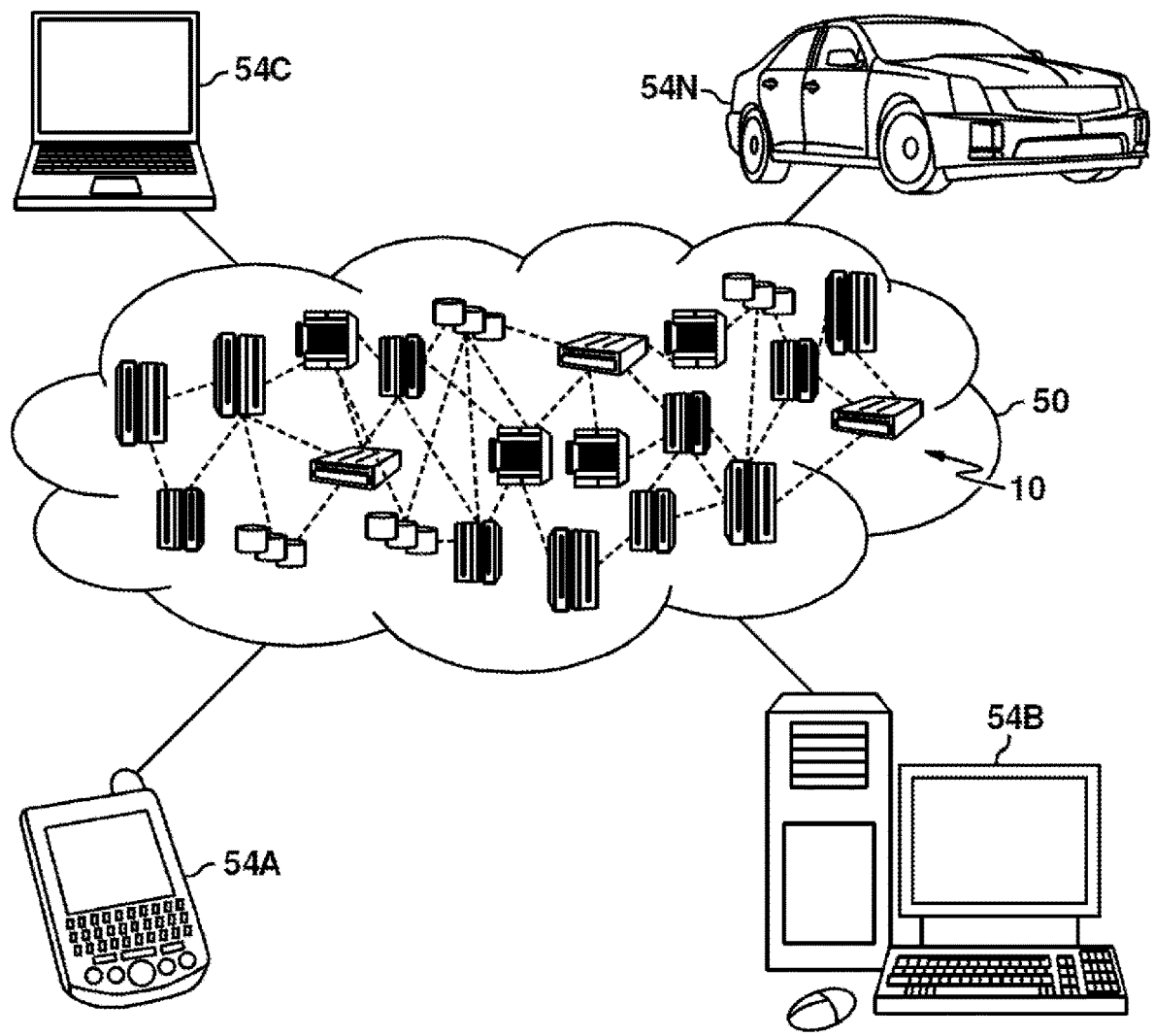
FIG. 1 depicts a cloud computing environment according to an embodiment.

In view of the above, embodiments disclosed herein may include system, method, and/or computer program product (herein system) that implements a lightweight cryptographic service that facilitates asymmetric encryption to provide technical effect and benefits, which include eliminating key life-cycle management associated with key pairs. Thus, embodiments described herein are necessarily rooted in a processor of a computer and/or a cloud service to perform proactive operations to overcome problems specifically arising in the realm of asymmetric encryption. For example, while the contemporary implementations described herein are non-optimal, embodiments of the lightweight cryptographic service described herein avoid a need for digital certificates and minimize key life-cycle management. For instance, whereas current state of the art practices use digital certificates that inherit a need for key life-cycle management, the system herein discards digital certificates altogether and manages a distribution of keys in isolation on demand. Further, the system herein eliminates a need for key stores, trust chains, distribution of certificates, renewal, and provides a means for asymmetric encryption encapsulated in a lightweight cloud service without these things.

In general, the system comprises a cloud service and a computing device in communication. In an example operation, the cloud service generates key pairs (related public and private keys) for the computing device once per unique identifier and distributes a private key of the key pair once to the computing device (which can be considered a requester to the cloud service). After the single distribution of the private key to the computing device by the cloud service, the public key is provided on demand to any device that requests the public key to enable applications and services within or connected to the system to perform asymmetric cryptographic operations as needed and without the distribution of keys in key stores or complex key life-cycle management. The cloud service can also implement a set of server process(es) that accept and respond to a set of CRUD (Create, Read, Update, Delete) style API requests (e.g., RESTful) from clients (e.g. applications) over a network. At least one of the clients can reside or be executed by the computing device of the system herein.

For example, an application running on a device, such as a smartphone, laptop, desktop, server, etc., can use the system herein to store or use a stored private key on the local device or the public key provided by the system herein, for encryption and decryption as required without an X.509 certificate or equivalent. That is, the system herein differentiates itself from existing methods by not using X.509 or equivalent certificates and "disentangles" the key pair, separating them across a network (i.e. they no longer reside side-by-side in a key store/keyring), and extricates the public key from the certificate. Remote systems and services likewise can use the system herein to encrypt and decrypt data sent by or to the device without certificates. No key life-cycle management is required by remote systems or services, nor the local device other than the initial create and final delete requests. The system herein in effect allows every participating application/service on a network to have its own key pair for asymmetric cryptographic operations (on the fly) without the need for digital certificates.

It is understood in advance that although this disclosure includes a detailed description on cloud computing, implementation of the teachings recited herein are not limited to a cloud computing environment. Rather, embodiments herein are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
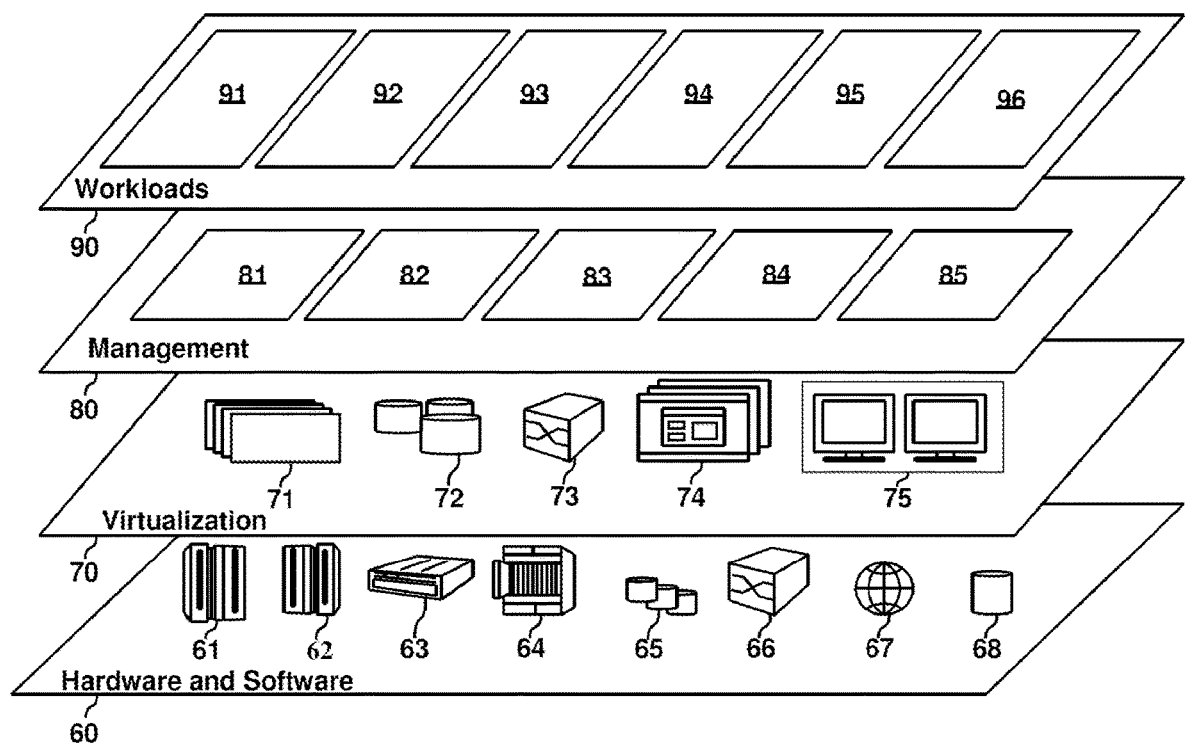
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments herein are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3:
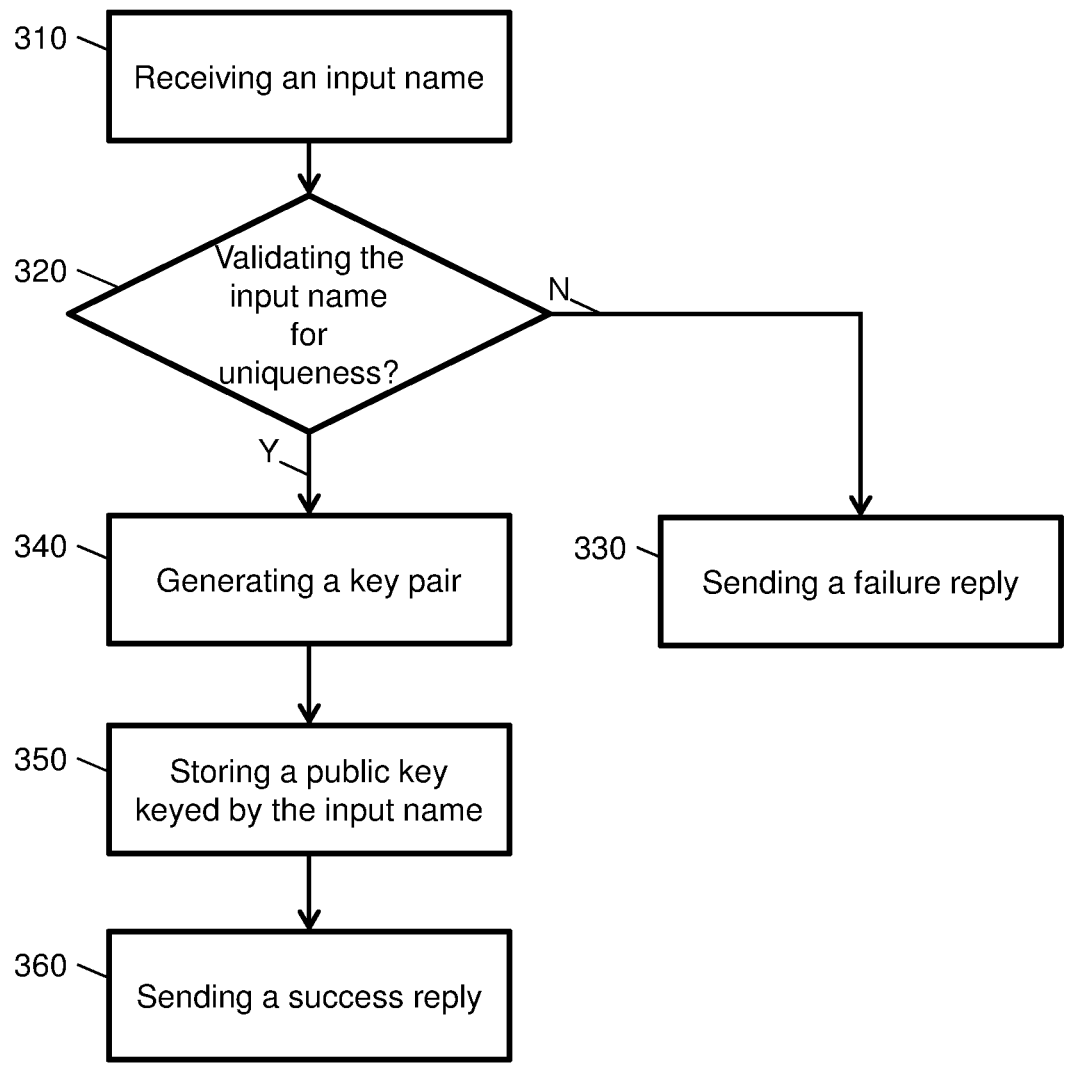
FIG. 3 depicts a process flow of a system in accordance with one or more embodiments.

Turning now to FIG. 3, a process flow 300 of a system is generally shown in accordance with one or more embodiments. The system provides the (lightweight) cryptographic service. The system can be an electronic, computer framework comprising and/or employing any number and combination of computing device and networks utilizing various communication technologies, as described herein (e.g., a cloud environment). In turn, the system can be easily scalable, extensible, and modular, with the ability to change to different services or reconfigure some features independently of others. The process flow 300 of the system provides a key pair generation aspect (e.g., creating a key pair and input name association) of the cryptographic service that facilitates asymmetric encryption.

The process flow 300 begins at block 310, where the system receives an input name. The input name can be any data that expresses a unique value to the system, e.g., an alpha-numeric combination producing a unique name. In accordance with one or more embodiments, the unique name can be an email address, as email address tend to uniquely identify individuals. The input name is originated by a requester, e.g., a client application communicating to the system (any participating application on a network that can have its own key pair for asymmetric cryptographic operations). The requester can submit the input name to the system via a generate message, which requests a creation of a key pair and input name association. At decision block 320, the system validates the input name for uniqueness. Determining whether the input name is unique can include determining by the system whether the input name is found within a current list of input names maintained by the system. If the input name is not found, then the input name is determined to be a valid new name or unique. If the input name is found, then the input name is determined to not be a valid new name or unique. Thus, if the input name is not unique, the process flow 300 proceeds to block 330 (as indicated by the 'N' Arrow). At block 330, the system sends a failure reply. The failure reply can comprise a message from the system to the requester indicating that the key pair cannot be generated for the submitted input name, as the input name already exists (and a key pair has already been generated). The requester can then proceed with submitting a new input name, which would return the process flow 300 to block 310.

Returning to decision block 320, if the input name is unique, the process flow 300 proceeds to block 340 (as indicated by the 'Y' Arrow). At block 340, the system generates a key pair. The key pair enables the cryptographic service of the system to avoid digital certificates or associated key life-cycle management for the encryption of data between the requester, the system, and one or more remote system (e.g., eliminate digital certificates from the infrastructure so that life-cycle management is minimized). Key pairs are generated once per unique identifier. The key pair comprises a private key and a public key. In accordance with one or more embodiments, the unique name is associated with the public key and for subsequent retrieval and deletion. The private key is distributed once to the requester. The public key is provided on demand to the requester and the one or more remote system by the system (e.g., anyone who requests it). Thus, the requester and the one or more remote system, such as applications and services, can perform asymmetric cryptographic operations as and when needed, without the distribution of keys in key stores or complex key life-cycle management. At block 350, the system stores the public key keyed by the input name. The public key can be stored in a database of the system. At block 360, the system sends a success reply. The success reply can comprise a message from the system to the requester indicating that the key pair has been generated for the submitted input name. The success reply includes the private key (note that the public key is optional in the success reply). The requester can then proceed with utilizing the key pair. The requester is responsible for saving the private key so that local applications can use it as needed.

Figure 4:
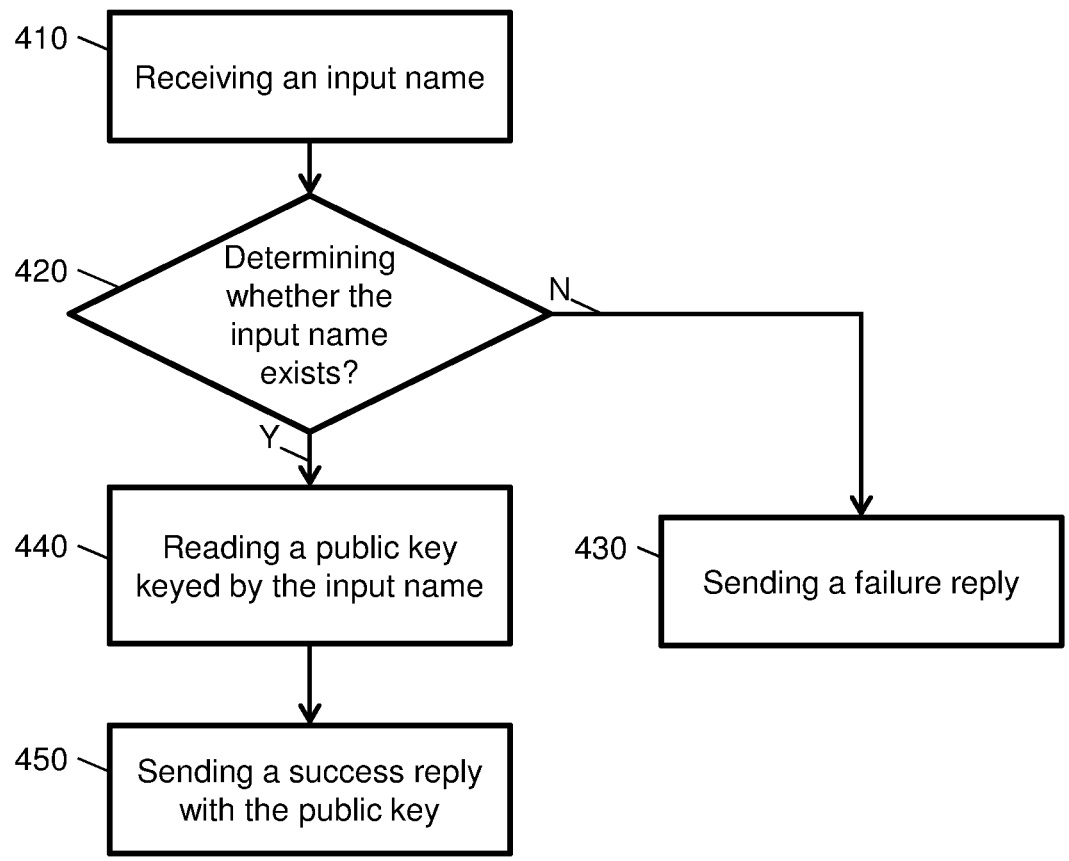
FIG. 4 depicts a process flow of a system in accordance with one or more embodiments.

Turning now to FIG. 4, a process flow 400 of the system (as described herein) is generally shown in accordance with one or more embodiments. The process flow 400 of the system provides a key retrieve aspect (e.g., retrieving a public key by an input name) of the cryptographic service that facilitates asymmetric encryption.

The process flow 400 begins at block 410, where the system receives an input name. The input name can be originated by a requester and/or one or more remote system (e.g., anyone who wants/needs it). The requester can submit the input name to the system via a retrieve message, which requests retrieving a public key corresponding to the input name. At decision block 420, the system determines whether the input name exists. Determining whether the input name exists can include determining by the system whether the input name is found within a current list of input names maintained by the system. If the input name is not found, then the input name is determined to be a new name. If the input name is found, then the input name is determined to exist. Thus, if the input name is a new name, the process flow 400 proceeds to block 430 (as indicated by the 'N' Arrow). At block 430, the system sends a failure reply. The failure reply can comprise a message from the system to the requester (or other system) indicating that the input name does not exists (and that there is no corresponding key pair). The requester can then proceed with submitting a different input name, which would return the process flow 400 to block 410.

Returning to decision block 420, if the input name exists, the process flow 400 proceeds to block 440 (as indicated by the 'Y' Arrow). At block 440, the system reads a public key keyed by the input name. For instance, the system utilizes the input name to identify a corresponding public key stored on a database. The system then reads a public key that corresponds to the input name. At block 450, the system sends a success reply with the public key. The success reply can comprise a message from the system to the requester indicating that the key pair has been generated for the submitted input name. The requester and/or the one or more remote systems can then proceed with utilizing the public key.

Figure 5:
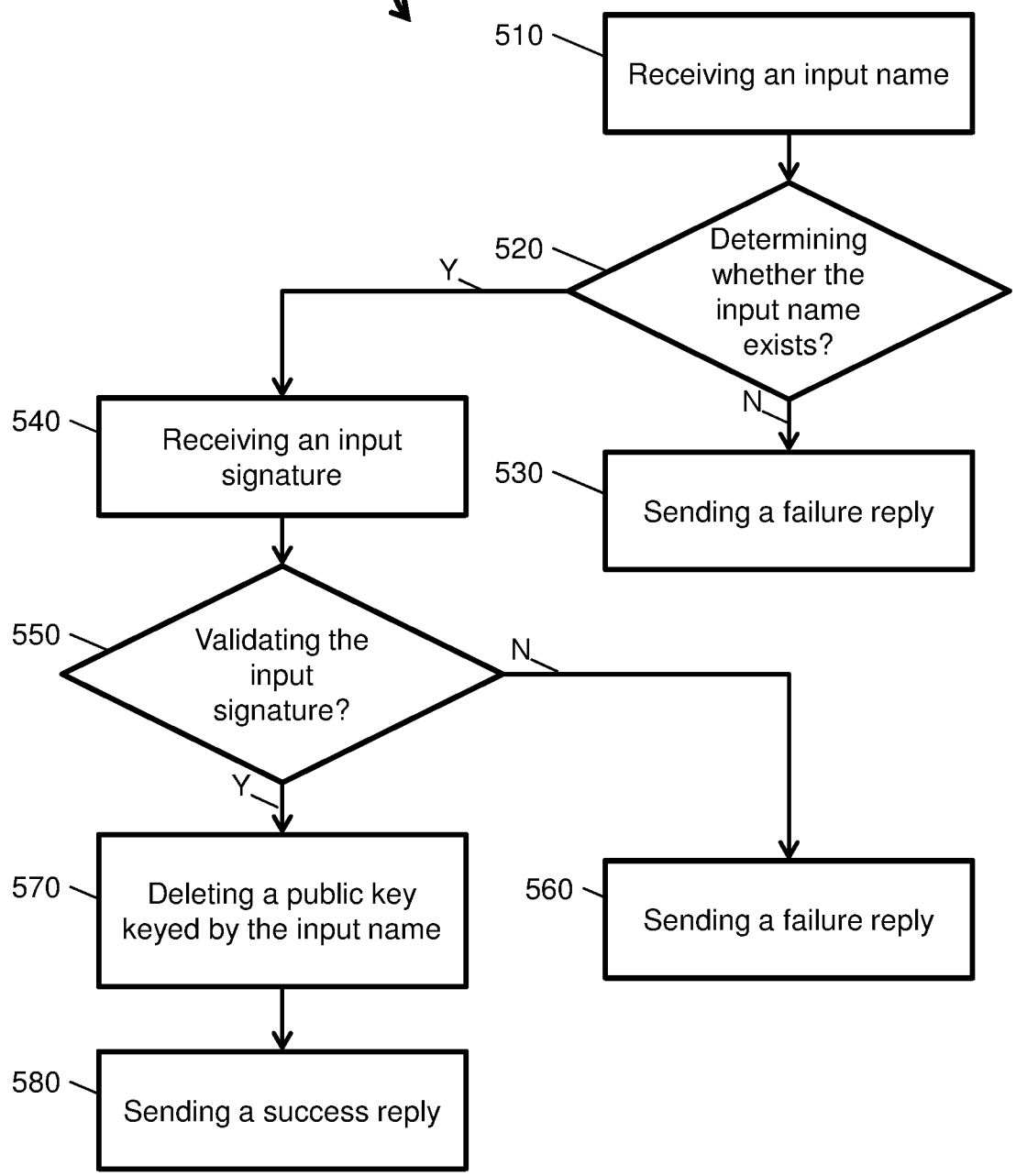
FIG. 5 depicts a process flow of a system in accordance with one or more embodiments.

Turning now to FIG. 5, a process flow 500 of the system (as described herein) is generally shown in accordance with one or more embodiments. The process flow 500 of the system provides a key deletion aspect (e.g., deleting a key pair by an input name) of the cryptographic service that facilitates asymmetric encryption.

The process flow 500 begins at block 510, where the system receives an input name. The input name is originated by a requester. The requester can submit the input name to the system via a delete message, which requests a deletion of a key pair corresponding to the input name. At decision block 520, the system determines whether the input name exists. Determining whether the input name exists can include determining by the system whether the input name is found within a current list of input names maintained by the system. If the input name is not found, then the input name is determined to be a new name. If the input name is found, then the input name is determined to exist. Thus, if the input name is a new name, the process flow 500 proceeds to block 530 (as indicated by the 'N' Arrow). At block 530, the system sends a failure reply. The failure reply can comprise a message from the system to the requester indicating that the new name does not exists (and that there is no corresponding key pair to delete). The requester can then proceed with submitting a different input name, which would return the process flow 500 to block 510.

Returning to decision block 520, if the input name exists, the process flow 500 proceeds to block 540 (as indicated by the 'Y' Arrow). At block 540, the system receives an input signature. The input signature or digital signature is associated with the requester. The input signature can comprise an encrypted hash of the input name (using a private key). The requester can submit the input signature, with the input name, to the system via the delete message. The requester can also submit the input signature via a message independent of the delete message. At decision block 550, the system validates the input signature. Determining whether the input signature is valid can include verifying the input signature using the public key associated with the input name. Thus, if the input signature is invalid, the process flow 500 proceeds to block 560 (as indicated by the 'N' Arrow). At block 560, the system sends a failure reply. The failure reply can comprise a message from the system to the requester indicating that the key pair cannot be deleted for the submitted input signature, as the input signature is invalid. The requester can then proceed with submitting a new input name, which would return the process flow 500 to block 510, or with submitting a new signature, which would return the process flow 500 to block 540.

Returning to decision block 550, if the input signature is valid, the process flow 500 proceeds to block 570 (as indicated by the 'Y' Arrow). At block 570, the system deletes a public key keyed by the input name. For instance, the system utilizes the input name to identify a corresponding key pair stored on a database. The system then deletes a public key of that corresponding key pair. The system can also delete a private key of that corresponding key pair and/or the key pair and input name (altogether). In accordance with one or more embodiments, the system may not store the key pair and, instead, only store the public key in association with the unique name. At block 580, the system sends a success reply. The success reply can comprise a message from the system to the requester indicating that the public key, the private key, the key pair, and/or the input name has been deleted. From that deletion moment on, no subsequent request can be made to the system for requester and/or the one or more remote systems can then proceed with utilizing the public key.

Figure 6:
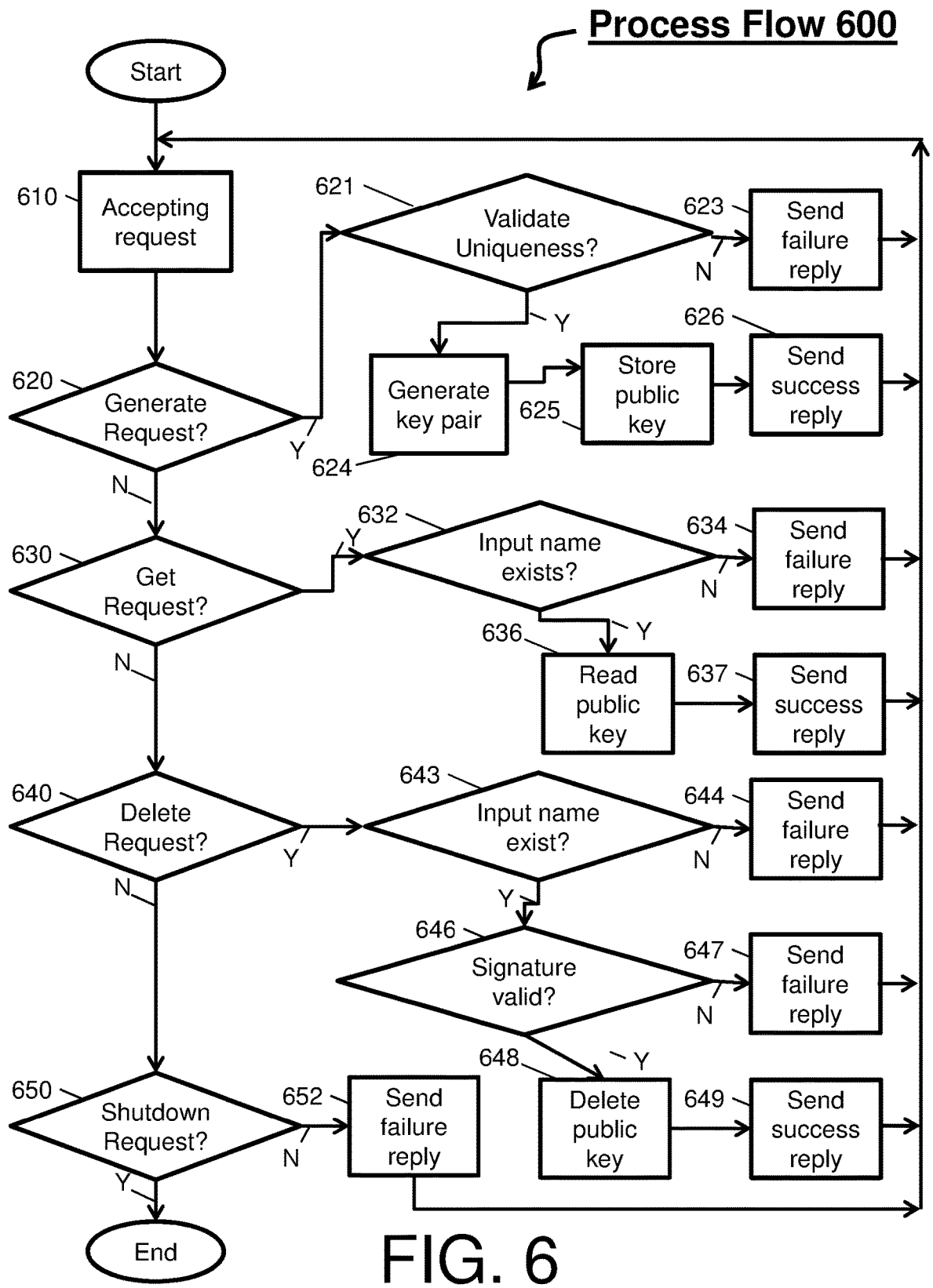
FIG. 6 depicts a process flow of a system in accordance with one or more embodiments.

Turning now to FIG. 6, a process flow 600 of the system (as described herein) is generally shown in accordance with one or more embodiments. The process flow 600 of the system provides a set of operation aspects of the cryptographic service that facilitates asymmetric encryption. The process flow 600 begins by proceeding from the 'START' circle to block 610. At block 610, the system accepts a request. The accepted request can be representative of one or more requests, such as a generate request, a get request, a delete request, and a shutdown request.

At decision block 620, the system determines whether the accepted request is a generate request. If the accepted request is the generate request, then the process flow 600 proceeds to block 621 (as indicated by the 'Y' arrow). The generate request provides a generate key pair/name association. Note that the generate request can be encrypted, e.g., by HTTPS. At decision block 621, the system validates an input name for uniqueness. The input name can be provided with the generate request. If the input name is not unique (i.e., currently registered), the process flow 600 proceeds to block 623 (as indicated by the 'N' Arrow). At block 623, the system sends a failure reply. Returning to decision block 621, if the input name is unique, the process flow 600 proceeds to block 624 (as indicated by the 'Y' Arrow). At block 624, the system generates a key pair including a public key. At block 625, the system stores the public key keyed by the input name. The public key can be stored in a database of the system. At block 626, the system sends a success reply. The success reply includes the private key (note that the public key is optional in the success reply). Returning to decision block 620, if the accepted request is not the generate request, then the process flow 600 proceeds to decision block 630 (as indicated by the 'N' arrow).

At decision block 630, the system determines whether the accepted request is a get request. If the accepted request is the get request, then the process flow 600 proceeds to decision block 632 (as indicated by the 'Y' arrow). The get request provides a retrieve public key by name operation. Note that the get request can be encrypted, e.g., by HTTPS, to avoid 'man-in-the-middle' attacks that could potentially provide 'false' public keys if intercepting network traffic from the requester. At decision block 632, the system determines whether the input name exists. The input name can be provided with the get request. If the input name is a new name, the process flow 600 proceeds to block 634 (as indicated by the 'N' Arrow). At block 634, the system sends a failure reply. The failure reply can comprise a message indicating that the input name does not exists (and that there is no corresponding key pair). Returning to decision block 632, if the input name exists, the process flow 600 proceeds to block 636 (as indicated by the 'Y' Arrow). At block 636, the system reads a public key keyed by the input name. At block 637, the system sends a success reply with the public key. Returning to decision block 630, if the accepted request is not the get request, then the process flow 600 proceeds to decision block 640 (as indicated by the 'N' arrow).

At decision block 640, the system determines whether the accepted request is a delete request. The delete request provides a delete key/name association. Note that the delete request does not need to be encrypted. The delete request can include the input name and the input signature. If the accepted request is the delete request, then the process flow 600 proceeds to decision block 643 (as indicated by the 'Y' arrow). At decision block 643, the system determines whether the input name exists. If the input name is a new name, the process flow 600 proceeds to block 644 (as indicated by the 'N' Arrow). At block 644, the system sends a failure reply. The failure reply can comprise a message indicating that the new name does not exist (and that there is no corresponding key pair to delete). Returning to decision block 643, if the input name exists, the process flow 600 proceeds to decision block 646 (as indicated by the 'Y' Arrow). At decision block 646, the system determines whether the input signature is valid. If the input signature is invalid, the process flow 600 proceeds to block 647 (as indicated by the 'N' Arrow). At block 647, the system sends a failure reply. The failure reply can comprise a message indicating that the key pair cannot be deleted for the submitted input signature, as the input signature is invalid. Returning to decision block 646, if the input signature is valid, the process flow 600 proceeds to block 648 (as indicated by the 'Y' Arrow). At block 648, the system deletes a public key keyed by the input name. At block 649, the system sends a success reply. Note that as an alternative to an explicit delete request, the system can delete key pairs automatically if they are not used for a configurable period of time, e.g. selected from a range of 1 to 6 months. Returning to decision block 640, if the accepted request is not the delete request, then the process flow 600 proceeds to decision block 650 (as indicated by the 'N' arrow).

At decision block 650, the system determines whether the accepted request is a shutdown request. If the accepted request is not the shutdown request, then the process flow 600 proceeds to the block 652. At block 652, the system sends a failure reply. The failure reply can be a message indicating that the accepted request was not recognized or that a shutdown operation was not performed. If the accepted request is the shutdown request, then the process flow 600 proceeds to the 'End' circle where the system performs the shutdown operation.

In view of the above and in accordance with one or more embodiments, an operation of the system can include when a mobile application wants to communicate with a cloud service, but a user/developer wants all traffic to be encrypted. Instead of HTTPS (which pre-requires digital certificates and key life-cycle management), the mobile application on install uses the system described herein to generate a key pair association, store a private key of the key pair locally, and cause the encryption all traffic to a cloud service using the private key (while decrypting anything received from the cloud service also with the private key). The cloud service further can utilize the system described herein to get/provide a public key to decrypt traffic from any client and encrypt traffic to any client. In turn, if the client wants to store data on the cloud service, the client can use the system herein to get the public key and encrypt the relevant data prior to transmission. In this way, all private data stored in the cloud service is digestible by the client.

In view of the above, the technical effect and benefits of the system herein include a lightweight cryptographic service that can be used over any network, such as the internet, for the purpose of asymmetric encryption, without the need for costly digital certificates, or the need for complex and error-prone key life-cycle management. Further, any program interacting on the network can 'own' a key pair. In turn, developers operating applications and systems can encrypt/decrypt without having to worry about certificate key stores and dissemination of certificates, trust chains, and/or certificate expirations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for a cryptographic service facilitating asymmetric encryption, the cryptographic service implemented on one or more computer systems, the method comprising:
receiving, by the cryptographic service, one or more unique identifiers;
determining, by the cryptographic service, whether each of the one or more unique identifiers is valid;
generating, by the cryptographic service, a key pair per unique identifier of the one or more unique identifiers based on whether the corresponding unique identifier is valid; and
sending, by the cryptographic service, a success reply including a private key for each key pair generation,
wherein the key pair enables the cryptographic service to avoid digital certificates or associated key life-cycle management for the encryption of data between a requester and one or more remote system, wherein in the key pair comprises the private key and a public key, the private key being distributed once to a requester and the public key being provided on demand, wherein the method of the cryptographic service provides a success reply including a public key to a remote system upon receiving the unique identifier from the remote system and validating the unique identifier received from the remote system with respect to a get request from the remote system.

2. The method of claim 1, wherein the method of the cryptographic service sends a failure reply based on whether the corresponding unique identifier is invalid.

3. The method of claim 1, wherein the method of the cryptographic service deletes an association of the key pair and the unique identifier of the one or more unique identifiers upon validating the unique identifier and an input signature with respect to a delete request from a requester.

4. The method of claim 3, wherein the method of the cryptographic service sends a failure reply based on whether the unique identifier of the one or more unique identifiers or the input signature is invalid.

5. A computer program product for a cryptographic service facilitating asymmetric encryption, the cryptographic service implemented on one or more computer systems, the computer program product comprising a computer readable storage medium having program instructions embodied therewith, the program instructions executable by at least one of processor of the one or more computer systems to cause:

receiving, by the cryptographic service, one or more unique identifiers;

determining, by the cryptographic service, whether each of the one or more unique identifiers is valid;

generating, by the cryptographic service, a key pair per unique identifier of the one or more unique identifiers based on whether the corresponding unique identifier is valid; and sending, by the cryptographic service, a success reply including a private key for each key pair generation, wherein the key pair enables the cryptographic service to avoid digital certificates or associated key life-cycle management for the encryption of data between a requester and one or more remote system, wherein in the key pair comprises the private key and a public key, the private key being distributed once to a requester and the public key being provided on demand, wherein the method of the cryptographic service provides a success reply including a public key to a remote system upon receiving the unique identifier from the remote system and validating the unique identifier received from the remote system with respect to a get request from the remote system, wherein the key pair enables the cryptographic service to avoid digital certificates or associated key life-cycle management for the encryption of data between a requester and one or more remote system, wherein in the key pair comprises the private key and a public key, the private key being distributed once to a requester and the public key being provided on demand, wherein the method of the cryptographic service provides a success reply including a public key to a remote system upon receiving the unique identifier from the remote system and validating the unique identifier received from the remote system with respect to a get request from the remote system.

6. The computer program product of claim 5, wherein the program instructions are further executable by the processor to cause the cryptographic service to send a failure reply based on whether the corresponding unique identifier is invalid.

7. The computer program product of claim 5, wherein the program instructions are further executable by the processor to cause the cryptographic service to delete an association of the key pair and the unique identifier of the one or more unique identifiers upon validating the unique identifier and an input signature with respect to a delete request from a requester.

8. The computer program product of claim 5, wherein the program instructions are further executable by the processor to cause the cryptographic service to send a failure reply based on whether the unique identifier of the one or more unique identifiers or the input signature is invalid.

9. A cryptographic service system comprising a processor and a memory storing program instructions for a cryptographic service facilitating asymmetric encryption thereon, the program instructions executable by the processor to cause:

receiving, by the cryptographic service system, one or more unique identifiers;

determining, by the cryptographic service system, whether each of the one or more unique identifiers is valid;

generating, by the cryptographic service system, a key pair per unique identifier of the one or more unique identifiers based on whether the corresponding unique identifier is valid; and sending, by the cryptographic service system, a success reply including a private key for each key pair generation, wherein the key pair enables the cryptographic service to avoid digital certificates or associated key life-cycle management for the encryption of data between a requester and one or more remote system, wherein in the key pair comprises the private key and a public key, the private key being distributed once to a requester and the public key being provided on demand, wherein the method of the cryptographic service provides a success reply including a public key to a remote system upon receiving the unique identifier from the remote system and validating the unique identifier received from the remote system with respect to a get request from the remote system.

10. The cryptographic service system of claim 9, wherein the program instructions are further executable by the processor to cause the cryptographic service system to send a failure reply based on whether the corresponding unique identifier is invalid.

11. The cryptographic service system of claim 9, wherein the program instructions are further executable by the processor to cause the cryptographic service system to delete an association of the key pair and the unique identifier of the one or more unique identifiers upon validating the unique identifier and an input signature with respect to a delete request from a requester.

12. The cryptographic service system of claim 9, wherein the program instructions are further executable by the processor to cause the cryptographic service to send a failure reply based on whether the unique identifier of the one or more unique identifiers or the input signature is invalid.

* * * * *